(12) United States Patent
Kim et al.

(10) Patent No.: US 7,119,964 B2
(45) Date of Patent: Oct. 10, 2006

(54) COLOR ILLUMINATING SYSTEM AND PROJECTION TYPE IMAGE DISPLAY APPARATUS USING THE SAME

(75) Inventors: Dae-sik Kim, Suwon-si (KR); Kun-ho Cho, Suwon-si (KR); Sung-ha Kim, Seoul (KR); Hee-Joong Lee, Anyang-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/764,488

(22) Filed: Jan. 27, 2004

(65) Prior Publication Data

US 2004/0246589 A1    Dec. 9, 2004

(30) Foreign Application Priority Data

Jan. 27, 2003    (KR)    ............. 10-2003-0005194

(51) Int. Cl.
*G02B 27/10*    (2006.01)
(52) U.S. Cl. ....................... 359/626; 359/634
(58) Field of Classification Search ................ 359/618, 359/623, 626, 634, 639, 640; 362/282, 323, 362/322, 324; 349/5–9; 353/20, 30–33
See application file for complete search history.

(56) References Cited

U.S. PATENT DOCUMENTS 6,710,909 B1 *   3/2004   Naito .................... 359/291
6,839,095 B1 *   1/2005   Bierhuizen et al. ............ 349/9
6,850,369 B1 *   2/2005   Kim et al. .................. 359/626
2004/0046946 A1 * 3/2004  Kim .......................... 353/101

FOREIGN PATENT DOCUMENTS

| JP | 10-62775  | 3/1998 |
|----|-----------|--------|
| JP | 2002-40416 | 2/2002 |

\* cited by examiner

*Primary Examiner*—Timothy Thompson
*Assistant Examiner*—M. Hasan
(74) *Attorney, Agent, or Firm*—Sughrue Mion, PLLC

(57) ABSTRACT

A high-efficiency, compact color illuminating system and a projection type image display apparatus using the color illuminating system are provided. The color illuminating system includes a light source, a spiral lens disc that periodically scrolls light by rotational movement, and an optical unit that isolates light beams of different wavelengths from white light emitted from the light source and guides the isolated light beams to enter at least two effective regions of the spiral lens disc. The projection type image display apparatus includes the color illuminating system, an image forming unit that generates images using scrolling light from the spiral lens disc, and a projection lens unit that enlarges and projects the images formed by the image forming unit on a screen.

40 Claims, 13 Drawing Sheets

COLOR ILLUMINATING SYSTEM AND PROJECTION TYPE IMAGE DISPLAY APPARATUS USING THE SAME

CROSS REFERENCE TO RELATED APPLICATIONS

This application claims the priority of Korean Patent Application No. 2003-5194, filed on Jan. 27, 2003, in the Korean Intellectual Property Office, the disclosure of which is incorporated herein in its entirety by reference.

BACKGROUND OF THE INVENTION

1. Field of the Invention

The present invention relates generally to a color illuminating system that illuminates color light beams by separating them from white light emitted from a light source and a projection type image display apparatus using the color illuminating system. More particularly, the invention is directed to a color illuminating system that illuminates high-efficiency color light and minimizes the overall optical system size, and a projection type image display apparatus using the color illuminating system.

2. Description of the Related Art

In general, projection type image display apparatuses form images by projecting images generated by a micro-display system, such as a liquid crystal display or a digital micro-mirror display, on a screen by means of a light source.

Such projection type image display apparatuses may be classified into 1-panel type displays and 3-panel type displays depending on the number of micro-displays used. A 3-panel, projection type image display that utilizes three micro-displays arranged in the optical paths of separate red, blue, and green light beams ensures higher light efficiency but is structurally complicated and has a higher manufacturing cost.

A basic 1-panel, projection type image display apparatus can periodically isolate red, green, and blue light beams from incident white light with a simple structure using a color wheel. However, this type of device has poor light efficiency due to the use of the color wheel, which leads to loss of two thirds of the incident light. Thus, there has been manufactured 1-panel, projection type image display apparatuses in consideration of such light efficiency reduction.

An example of a conventional 1-panel, projection type image display apparatus is illustrated in FIG. 1. In the conventional 1-panel, projection type image display apparatus, non-polarized white light is generated and emitted by a light source 11. The emitted white light is made uniform while passing a fly-eye lens array 13 and is directed towards a polarizer 15. The polarizer 15 polarizes the non-polarized white light emitted from the light source 11 into white light having a predetermined polarization component. The white light passed through the polarizer 15 is split into red, blue, and green light beams by first and second dichroic lenses 17 and 19. The first dichroic lens 17 reflects light of a blue wavelength among the incident white light and transmits light of the other wavelengths. The light transmitted through the first dichroic lens 17 is split into green and red light beams by the second dichroic lens 19.

First, second, and third scanning prisms 21, 23, and 25 that periodically scroll incident light are disposed in the optical paths of the split color light beams. The first, second, and third scanning prisms 21, 23, and 25 have a rectangular prism and are turned by a driver (not shown). As the first, second, and third scanning prisms 21, 23, and 25 are turned, the angle of a side wall of each of the first, second, and third prisms 21, 23, and 25 to the optical axis is altered. The optical paths of the light passed through each of the first, second, and third scanning prisms 21, 23, and 25 is periodically altered.

When turning the first, second, and third scanning prisms 21, 23, and 25, an initial angle of rotation of each of the first, second, and third scanning prisms 21, 23, and 25 is set such that an effective image region of a display 33 is evenly divided by the lights passed through the first, second, and third scanning prisms 21, 23, and 25. As the first, second, and third scanning prisms 21, 23, and 25 are turned, sets of colored light beams (B, R, G), (G, B, R), and (R, G, B) alternately enter the effective image region of the display 33.

The light beams passed through the first and second scanning prisms 21 and 23 are combined together by a third dichroic mirror 27 and then combined with the light beam passed through the third scanning prism 25 by a fourth dichroic mirror 29. A reflecting mirror 18 is disposed between the first and third dichroic mirrors 17 and 27, and a reflecting mirror 20 is disposed between the second and fourth dichroic mirrors 19 and 29 to alter the paths of light.

The scrolling light that passes the fourth dichroic mirror 29 enters a polarizing beam splitter 31 that transmits or reflects the incident light depending on the polarization of the incident light. Light reflected by the polarizing beam splitter 31 is periodically scrolled such that sets of color light beams as illustrated in FIG. 2 alternately enter the display 33. The display 33 forms images from the incident light. The images are formed by changing the polarization of light to be output in units of a pixel. Only the light whose polarization component was altered after being incident on the display 33 is allowed to transmit the polarizing beam splitter 31 and go toward a projection lens unit 35. The projection lens unit 35 magnifies and projects the received images on a screen 50.

The projection type image display apparatus includes a plurality of relay lenses 41 through 48 disposed in optical paths to guide the light from the light source 11 up to the display 33.

Even though the above conventional projection type image display apparatus includes only one display to form color images, its optical structure is complicated. In addition, the three scanning prisms are separately turned for scrolling and it is difficult to synchronize them by driving the display.

SUMMARY OF THE INVENTION

The present invention provides a high-efficiency, compact color illuminating system with improved color separation and scrolling structures.

The present invention also provides a high-efficiency, compact, single-panel, projection type image display apparatus with a simplified optical structure of obtaining linear scrolling light beams through the rotational movement of a spiral lens.

In one aspect of the present invention, there is provided a color illuminating system comprising: a light source that generates and emits white light; a spiral lens disc that periodically scrolls light by rotational movement and has a spiral cylindrical lens array, which includes a plurality of cylindrical lenses, on at least one surface; and an optical unit that separates light beams of different wavelengths from the white light emitted from the light source and guides the light beams to enter at least two effective regions of the spiral lens disc.

In another aspect of the present invention, there is provided a projection type image display apparatus comprising: a light source that generates and emits white light; a spiral lens disc that periodically scrolls light by rotational movement and has a spiral cylindrical lens array, which includes a plurality of cylindrical lenses, on at least one surface; an optical unit that separates light beams of different wavelengths from the white light emitted from the light source and guides the light beams to enter at least two effective regions of the spiral lens disc; an image forming unit that forms images using the light from the spiral lens disc; and a projection lens unit that enlarges and projects the images formed by the image forming unit on a screen.

According to specific embodiments of the present invention, the optical unit may comprise: a color filter that separates the light beams of different wavelengths from the white light received from the light source and makes the light beams travel in a predetermined direction; and a beam splitter that splits the light beams from the color filter to enter the at least two effective regions of the spiral lens disc.

The optical unit may further comprise an integrated optical element that alters the direction in which light from one of the first and second effective regions of the spiral lens disc scrolls such that light beams from the first and second effective regions scroll in the same direction and that combines the light beams from the first and second effective regions.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
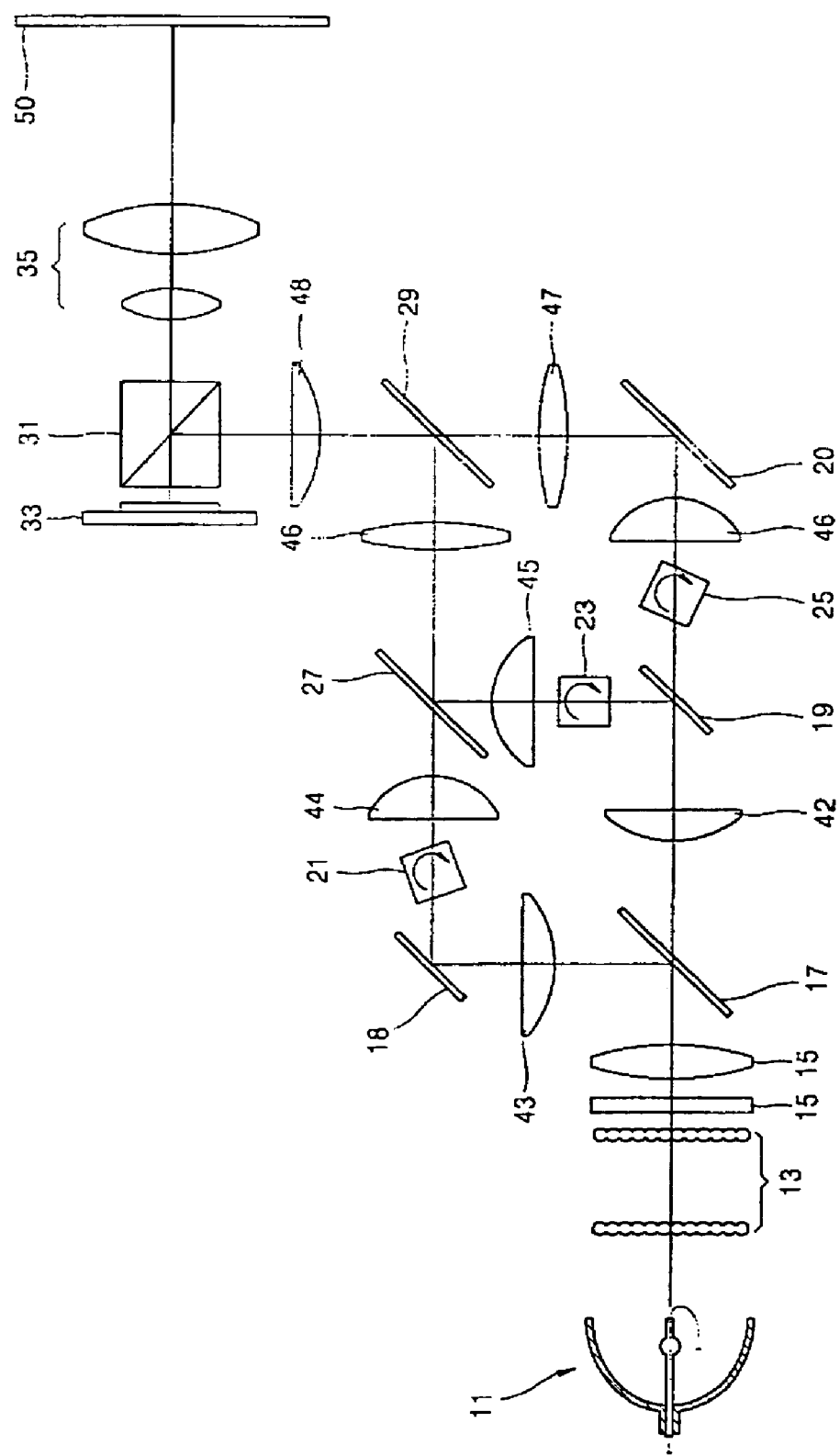
FIG. 1 illustrates the optical arrangement of a conventional 1-panel, projection type image display apparatus.
Figure 2:
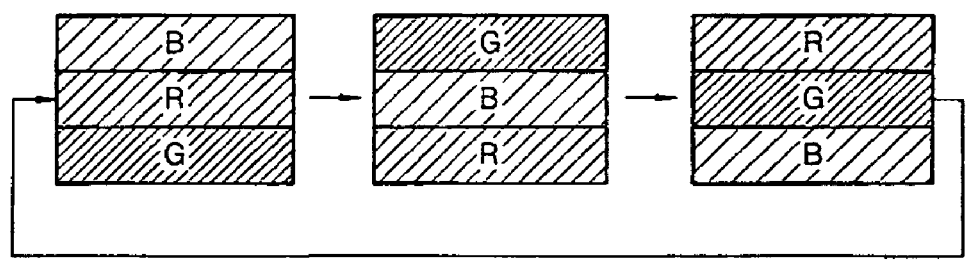
FIG. 2 illustrates change in the pattern of alternating color light beams when a scanning prism in FIG. 1 is driven.
Figure 3:
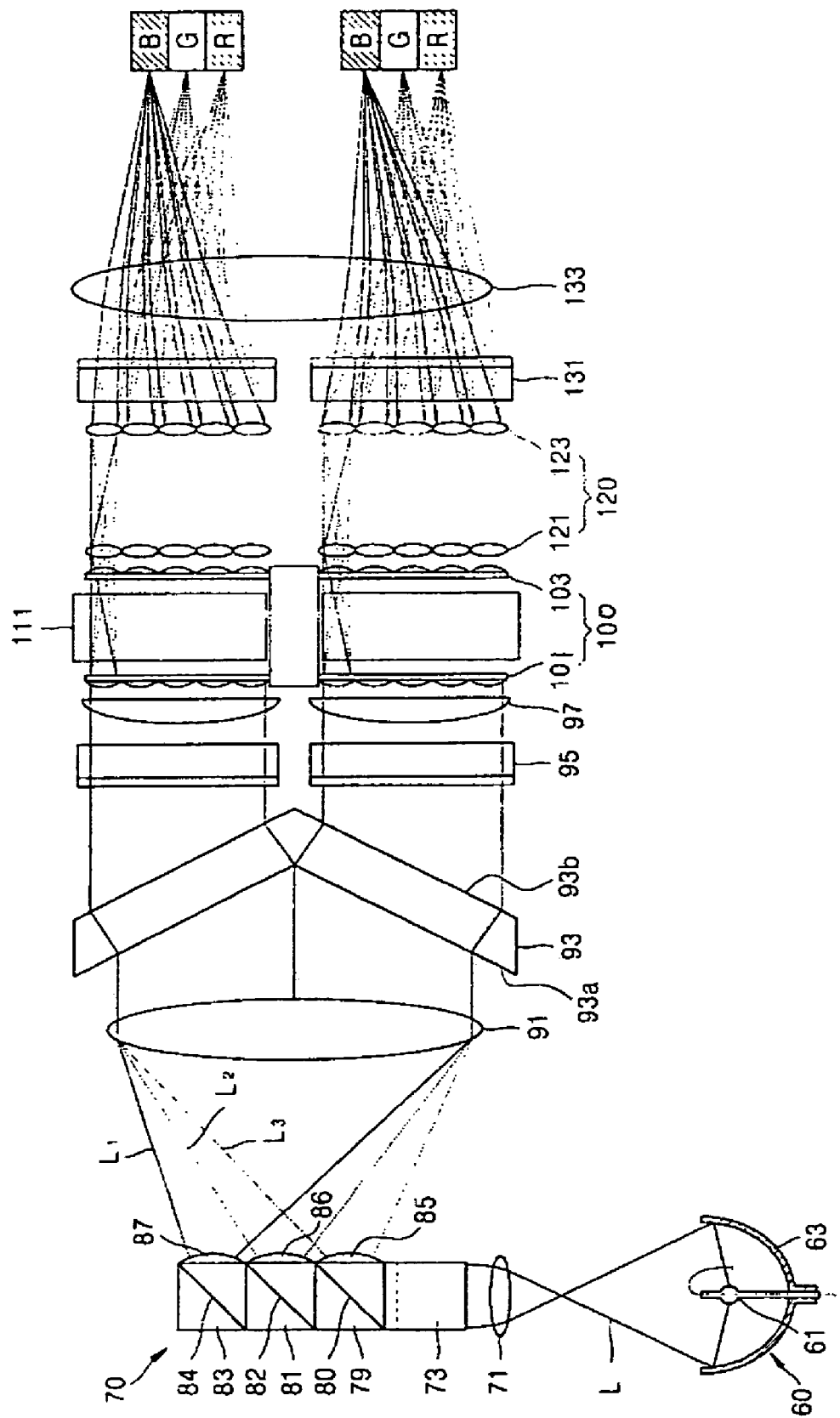
FIG. 3 illustrates the optical arrangement of a color illuminating system according to an embodiment of the present invention.

Referring to FIG. 3, a color illuminating system according to an embodiment of the present invention includes a light source 60, a spiral lens disc unit 100 that turns to periodically scroll light, and an optical unit that separates light beams of predetermined wavelengths from white light received from the light source 60 and guides the separated light beams to at least two effective regions of the spiral lens disc unit 100.

The light source 60, which generates and emits white light, includes a lamp 61 generating light and a reflector 63 reflecting the white light emitted from the lamp 61 towards an optical path. The reflector 63 may be an elliptical reflector or a parabolic reflector. An elliptical reflector provides two focal points: one being at the position of the lamp 61 and the other being where light is focused. A parabolic reflector collimates light emitted from the lamp 61 by reflection. In the color illuminating system of FIG. 3, an elliptical reflector is used as the reflector 63.

The optical unit includes a color filter 70 that separates the light beams of predetermined wavelengths from the white light emitted from the light source 60 and a beam splitter 93 that enlarges and splits the incident light.

Light beams which are separated by the color filter 70 travel at different angles. The color filter 70 raises the optical efficiency by suppressing the light incident with a predetermined angle from travelling in an undesired direction. In other words, the color filter 70 minimizes variations in etendue, which is the preserved optical physical quantity in optical systems.

To this end, the color filter 70 is implemented with first, second, and third dichroic prisms 79, 81, and 83, which reflect light of a particular wavelength range and transmit light of the other wavelength range, thereby splitting incident light L into first, second, and third color light beams $L_1$, $L_2$, and $L_3$, as illustrated in FIGS. 3 through 6.

The first dichroic prism 79 has a first mirror surface 80 that is inclined at an angle to the optical axis of the incident light L. The first mirror surface 80 reflects the first color light beam $L_1$ and transmits the second and third color light beams $L_2$ and $L_3$. For example, the first mirror surface 80 may reflect a blue light beam and transmits light of the other wavelength range. The first dichroic prism 79 includes first reflection surfaces 79a and 79b (FIG. 5) by which the light received at a predetermined angle is internally reflected. In particular, the first and second reflection surfaces 79a and 79b totally reflect the light that is received at a greater angle than a critical angle due to a difference in reflectivity between the first dichroic prism 79 and the external air medium, thereby raising the optical efficiency.

The second dichroic prism 81 disposed next to the first dichroic prism 79 has a second mirror surface 82 that is inclined at an angle to the optical axis of the incident light L. The second mirror surface 82 reflects the second color light $L_2$, for example, red light, and transmits light of the other wavelength range.

The third dichroic prism 83 disposed next to the second dichroic prism 83 has a third mirror surface 84 that is inclined at an angle to the optical axis of the incident light L. The third mirror surface 84 reflects the third color light beam $L_3$, for example, green light. The third dichroic prism 83 may be replaced with a total reflection mirror.

The second dichroic prism 81 includes second reflection surfaces 81a and 81b, and the third dichroic prism 83 includes third reflection surfaces 83a and 83b. The functions of the second reflection surfaces 81a and 81b and the third reflection surfaces 83a and 83b are substantially the same as the function of the first reflection surfaces 79a and 79b, and thus descriptions thereon will not be repeated here.

Figure 4:
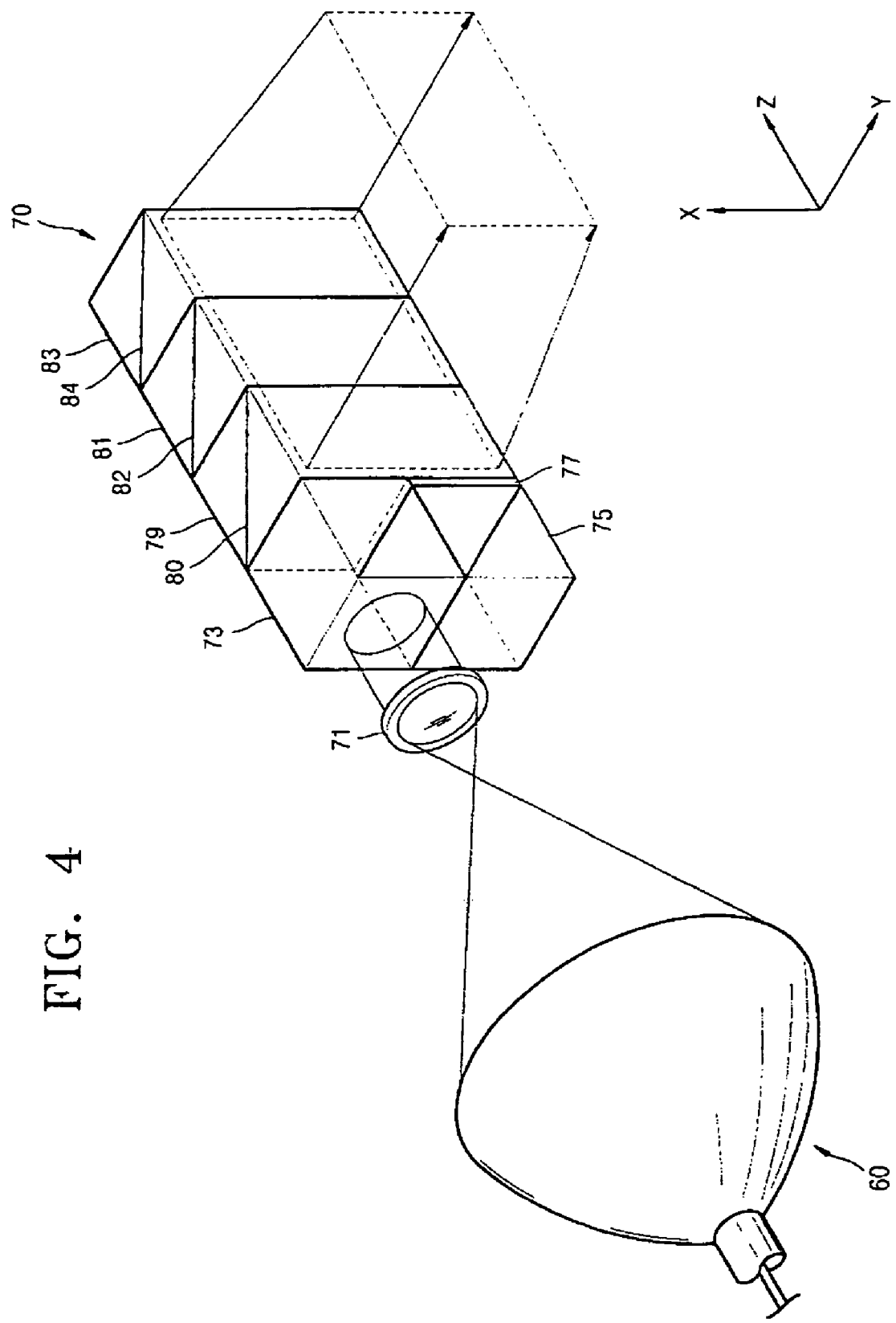
FIG. 4 is a perspective view illustrating the optical arrangement of a light source and a color filter in FIG. 3.
Figure 5:
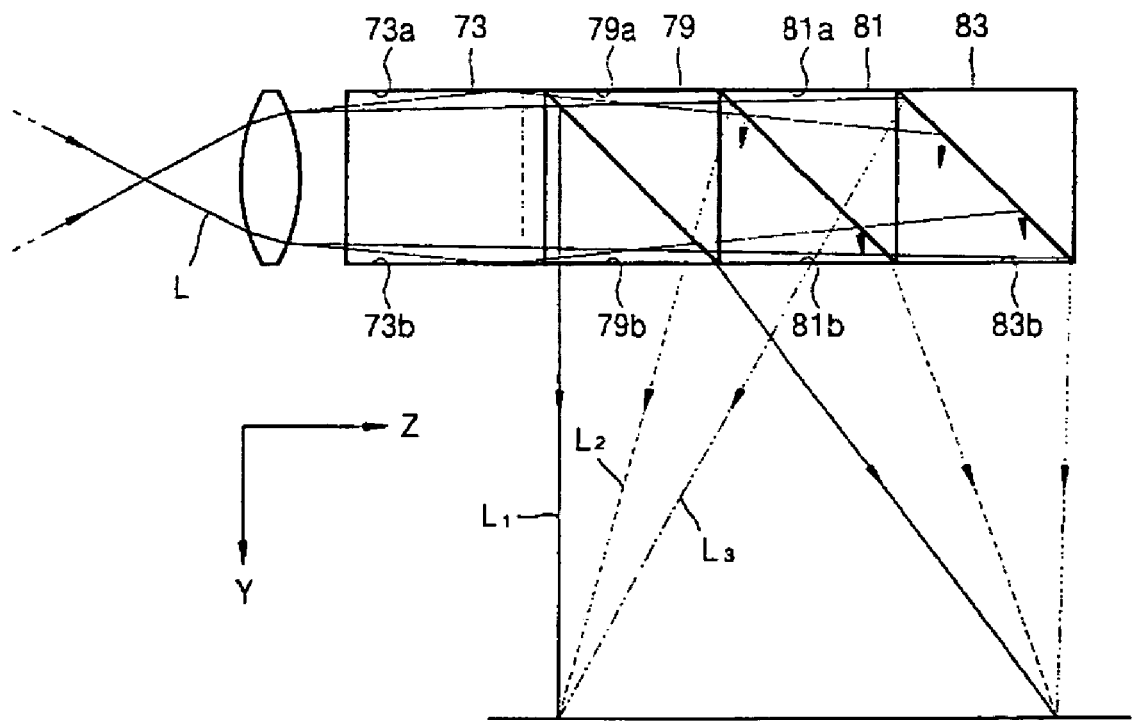
FIG. 5 is a plan view of the color filter in FIG. 4.

In the color filter 70 having the above structure, the first, second, and third light beams $L_1$, $L_2$, and $L_3$ reflected from the first, second, and third mirrors 80, 82, and 84 within a range illustrated in FIG. 4 are exclusively utilized as effective light.

The color filter 70 having the above structure is suitable for a projection type image display apparatus that utilizes a micro-mirror device that is independent of the polarization of incident light as an image forming unit.

The color filter 70 may further include a first collimating lens 71 that is disposed in front of the light source 60 to converge the incident light into parallel light.

The color filter 70 may further include first, second, and third relay lenses 85, 86, and 87 that are disposed on the light exit surfaces of the first, second, and third dichroic prisms 79, 81, and 83, respectively. The first, second, and third relay lenses 85, 86, and 87 converge the first, second, and third color light beams $L_1$, $L_2$, and $L_3$, respectively, at predetermined angles.

The color filter 70 may further include first and second polarizing beam splitters 73 and 75 and a half-wave plate 77 in an optical path between the first collimating lens 71 and the first dichroic prism 79, as illustrated in FIG. 4. The first polarizing beam splitter 73, which is disposed on the entrance surface of the first dichroic prism 79, transmits a first polarization component in the incident non-polarized white light toward the first dichroic prism 79 and reflects a second polarized light toward the second polarizing beam splitter 75. To this end, a first polarizing filter 74 is formed on a mirror surface of the first polarizing beam splitter 73.

Figure 6:
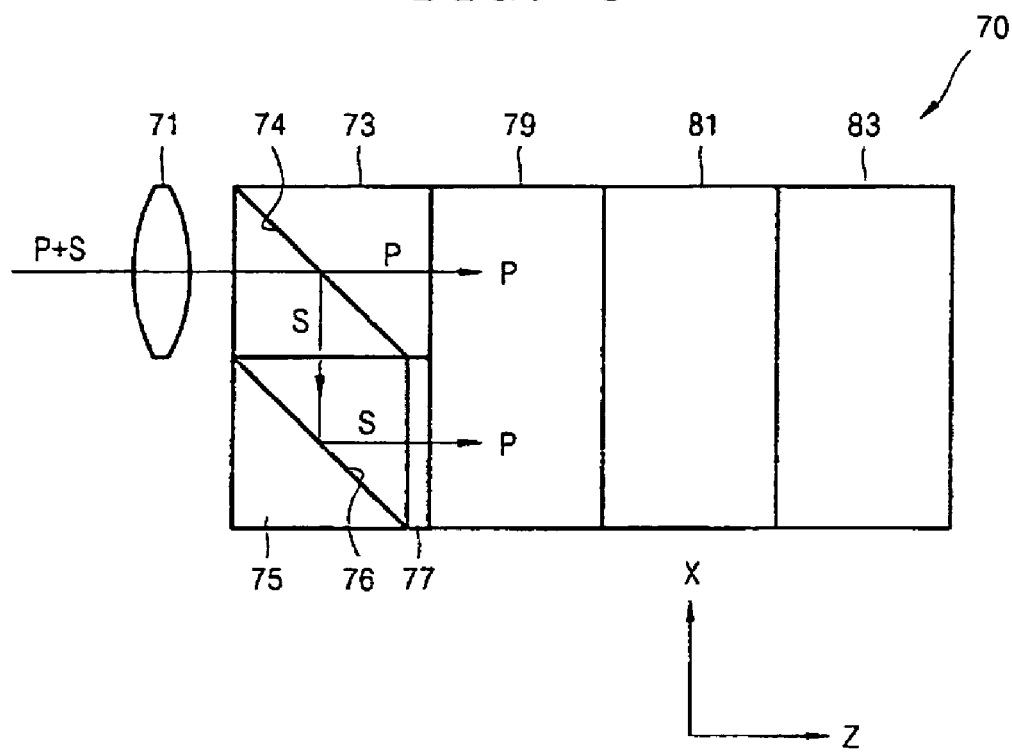
FIG. 6 is a front view of the color filter in FIG. 4.

FIG. 6 illustrates an example of the first polarizing filter 74 that transmits P-polarization component in the white light emitted from a light source and reflect S-polarization component in the white light.

The second polarizing beam splitter 75 reflects the second polarized light from the first polarizing beam splitter 73 again toward the first dichroic prism 79. As illustrated in FIG. 6, the second polarizing beam splitter 75 alters only the path of the incident, for example, S-polarized light, without affecting the polarization of the incident light so that the incident light travels parallel to the first polarized light transmitted through the first polarizing beam splitter 73. To this end, the second polarizing beam splitter 75 includes a second polarizing filter 76 that reflects a particular polarization component, for example, S-polarized light, of the incident light. The second polarizing beam splitter 75 may be implemented with a total reflection mirror, which totally reflects the incident light.

The half-wave plate 77 alters the phase of incident polarized light by 180 degrees, i.e., from a predetermined linear polarization component into another linear polarization component. An example of the half-wave plate 77 in FIGS. 3 through 6, which is disposed between the second polarizing beam splitter 75 and the first dichroic prism 79, changes the phase of the second polarized light to be the same as the first polarized light. In other words, the half-wave plate 77 changes the S-polarized light reflected by the second polarizing filter into P-polarized light that is the first polarized light. Alternatively, the half-wave plate 77 may be disposed between the first polarizing beam splitter 3 and the first dichroic prism 79 to alter the phase of the first polarized light to be the same as the second polarized light.

The use of the first and second polarizing beam splitters 73 and 75 enables using a liquid crystal display (LCD) as an image forming unit in a projection type display apparatus described later.

In the color filter 70, the first, second, and third dichroic prisms 79, 81, and 83 may be configured and optically arranged such that they transmit light of a particular color and reflect light of the other color. A process of manufacturing the first, second, and third dichroic prisms 79, 81, and 83 is well known in the field, and a description thereon will not be repeated here.

In the color illuminating system according to the present invention illustrated in FIG. 3, a second collimating lens 91 that collimates the first, second, and third color light beams $L_1$, $L_2$, and $L_3$ from the color filter 70 may be disposed on an optical path between the color filter 70 and the beam splitter 93.

The beam splitter 93, which is disposed in an optical path between the second collimating lens 91 and the spiral lens disc unit 100, splits each of the collimated color light beams having predetermined wavelengths into at least two portions. In other words, the beam splitter 93 shifts the collimated color light beams having the predetermined wavelengths toward at least two effective regions of a spiral lens disc 101 to avoid their reaching a driver 105 (see FIG. 9) of the spiral lens disc unit 100 that is disposed in the optical axis. The driver 105 will be described later.

Figure 7:
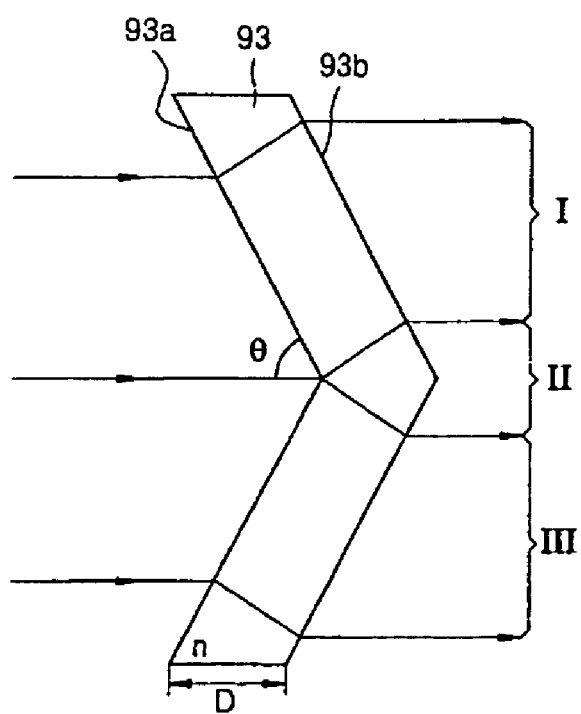
FIG. 7 illustrates the optical arrangement of a beam splitter in FIG. 3.

In particular, referring to FIG. 7, the beam splitter 93, which has a ">"-shaped cross-section, has an entrance surface 93a and an exit surface 93b. The entrance surface 91a refracts the incident first, second, and third color light beams $L_1$, $L_2$, and $L_3$ outward away from the optical axis such that at least two split light beams go toward the spiral lens disc unit 100. The exit surface 93b refracts the split light beams, which have been refracted by the entrance surface 91a, toward the optical axis to be parallel to the light beams incident on the entrance surface 91a. Splitting light by refraction is based on a difference in refractive index between the beam splitter 93 and air and the geometrical arrangement of the beam splitter 93.

Figure 8:
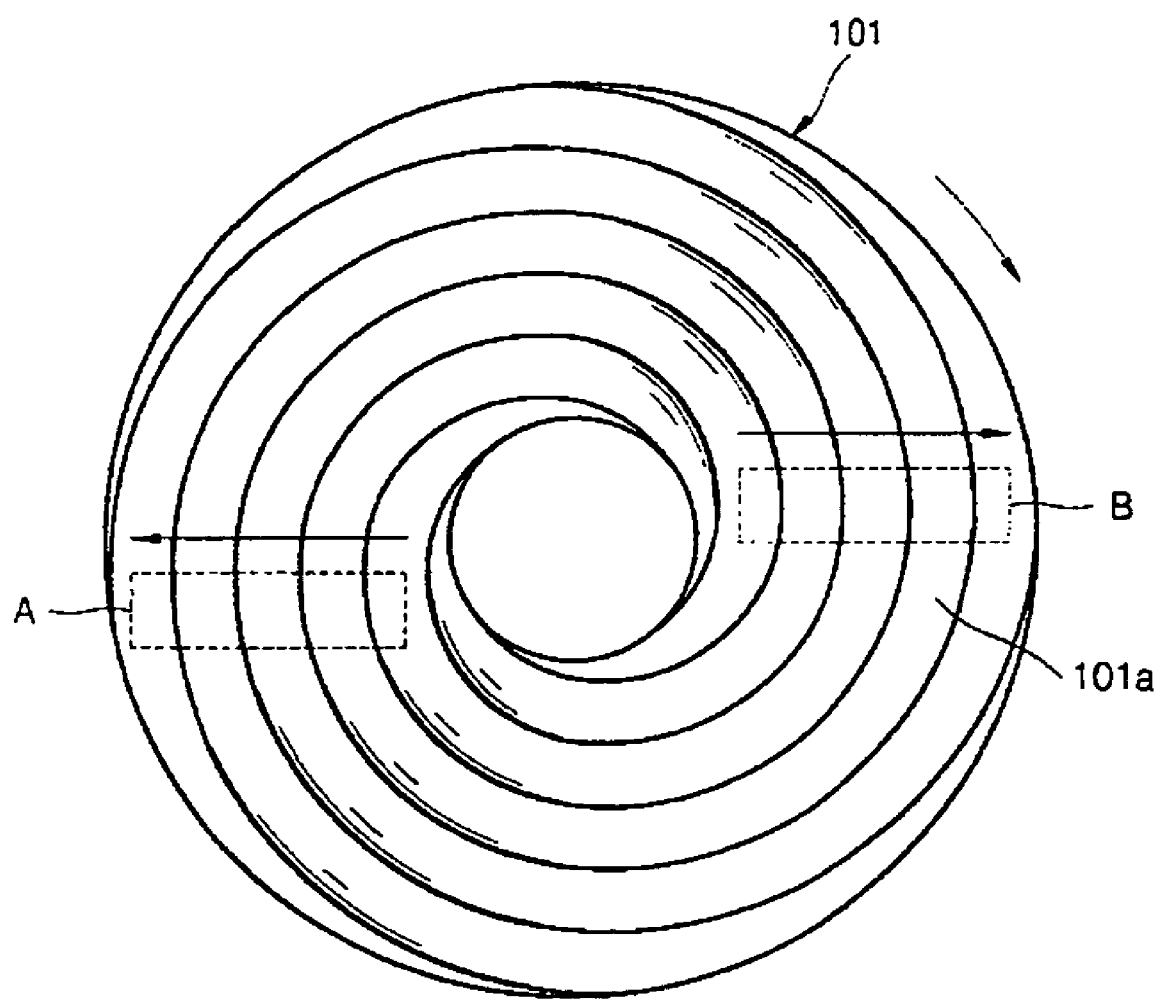
FIG. 8 is a plane view of a spiral lens disc in FIG. 3.
Figure 9:
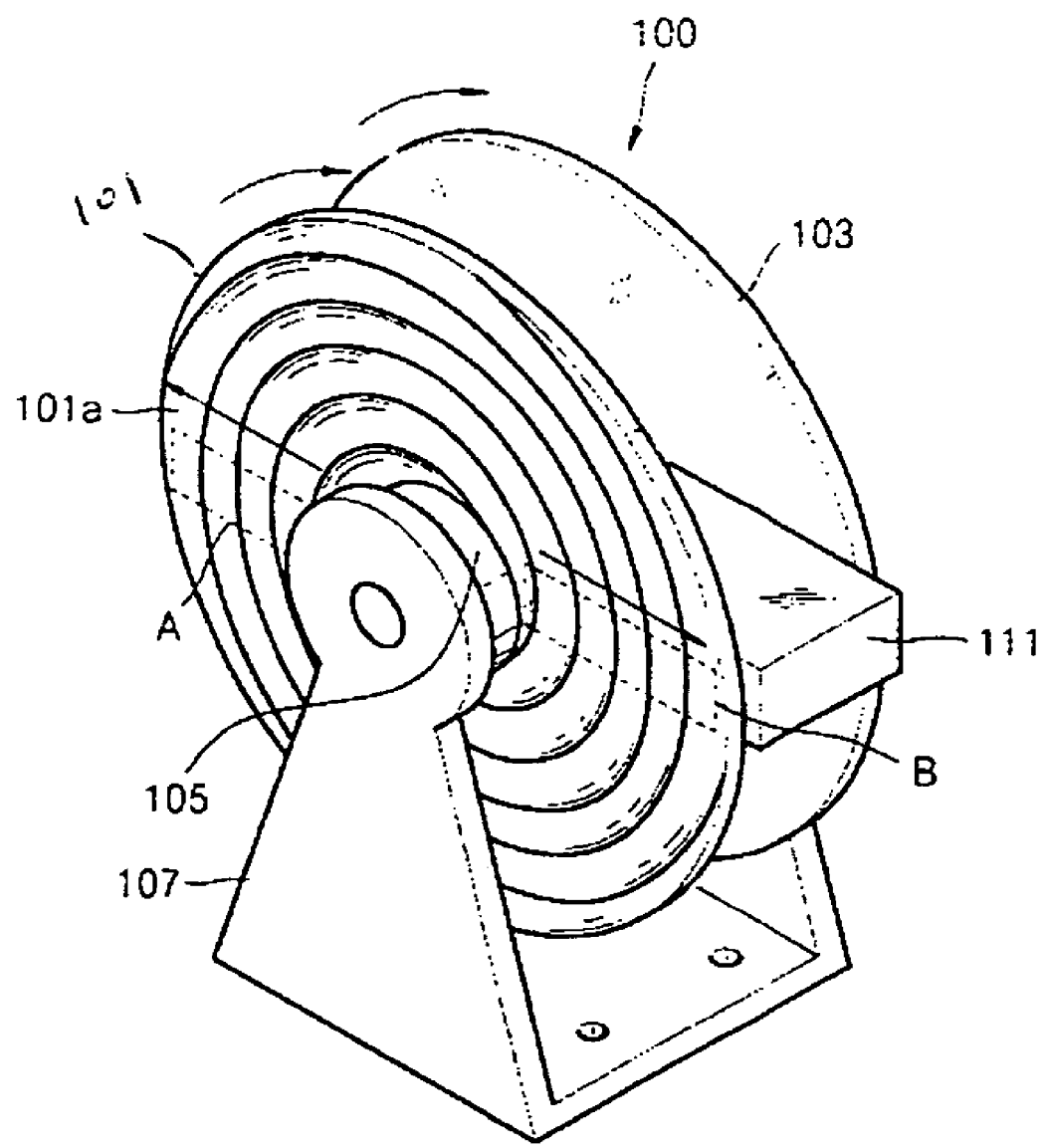
FIG. 9 is a perspective view of a spiral lens disc unit in FIG. 3.

A refractive index n of the beam splitter 93, an inclination angle θ of the entrance surface 93a and the exit surface 93b, and a thickness D of the beam splitter 93, i.e., the distance between the entrance surface 93a and the exit surface 93b, may be appropriately set such that the light beams refracted by the beam splitter 93 travel through only first and third regions I and III that correspond to the first and second effective regions A and B (see FIG. 8) of the spiral lens disc 101, not through a second region II aligned with the driver 105 (see FIG. 9). The amount of effective light may be increased by splitting light with the beam splitter 93 and utilizing the spiral lens disc unit 100 having the first and second effective regions A and B.

A plurality of cylindrical lenses 95 and 97 that act as a beam shaper are disposed in optical paths in the first and third regions I and III defined by the beam splitter 93. Each of the cylindrical lenses 95 and 97 shape incident light by converging a portion of the incident light and transmitting straight the other portion of the incident light such that the shape of the light passed through it fits one of the first and second effective regions A and B, which are denoted by dashed lines in FIG. 8.

The spiral lens disc unit 100, as illustrated in FIGS. 8 and 9, is supported by a bracket 107 in the optical path of the illuminating system. The spiral lens disc unit 100 includes at least one spiral lens disc 101 and the driver 105 that contacts the center of the spiral lens disc 101 to turn it.

The spiral lens disc 101 has a spiral cylindrical lens array 101a on at least one surface. The spiral lens disc 101 alters the paths of the color light beams that have passed through the color filter 70 while turning and periodically scrolls the color light beams. Scrolling light using the spiral lens disc 101 will now be described with the assumption that the spiral lens disc 101 turns clockwise at a predetermined rate.

The color light beams separated by the color filter 70 are appropriately shaped while passing through the cylindrical lenses 95 and 97 and enter the first and second effective regions A and B of the spiral lens disc 101. A portion of the cylindrical lens array 101 that is defined by the first effective region A acts as if comprising a plurality of cylindrical lenses arranged linearly side by side. Due to this geometry of the first effective region A, color light incident on the first effective region A is scrolled from an inner circumference of the spiral lens disc 101 towards an outer circumference. The principle of scrolling color light in the second effective region B is the same as in the first effective region A. However, the direction in which the color light is scrolled in the second effective region B is opposite to that in the first effective region A.

The spiral lens disc 101 may include two discs, i.e., a first spiral lens disc 102 and a second spiral lens disc 103. The first lens disc 102 scrolls incident light, and the second spiral lens disc 103, which is displaced spaced a predetermined distance from the first spiral lens disc 102, corrects the divergence angles of at least two split light beams passed through the first spiral lens disc 102.

A glass rod 111 that controls the angle of divergence of the light beams passed through the first spiral lens disc 102 may be disposed in an optical path between the first spiral lens disc 102 and the second spiral lens disc 103. The glass rod 111 allows the light converged by each cell of the first spiral lens disc 102 to enter the second spiral lens disc 103 without diverging.

In an embodiment, the color illuminating system according to the present invention may further include a fly-eye lens array 120, cylindrical lenses 131, and a fourth relay lens 133.

The fly-eye lens array 120 is disposed next to the second spiral lens disc 103 and forms in separate regions bands of color light from the light passed through the spiral lens disc 101. To this end, the fly-eye lens array 120 includes first fly-eye lenses 121 and second fly-eye lenses 123, each of which has a two-dimensional array of protrusions on an entrance surface and/or an exit surface. The first fly-eye lenses 121 may be located on a focal plane of the second spiral lens disc 103. The protrusions of each of the first and second fly-eye lenses 121 and 123 match one to one the individual cylindrical lenses in the array 101a in the first and second effective regions A and B of the spiral lens disc 101. The individual color light beams scrolled by the spiral lens disc 101 are converged while passing the first and second fly-eye lenses 121 and 123 and form separate bands of light of different colors.

The cylindrical lenses 131, which are disposed in separate optical paths, shape two light beams passed through the second fly-eye lenses 123 through the first and second effective regions A and B into first, second, and third color light beams of different colors.

The fourth relay lens 133 relays the light beams passed through the fly-eye lens array 120 to a predetermined location, for example, where an image forming unit 165 (see FIG. 10) is located.

The operation of the color illuminating system having the above structure according to the present invention will be described with reference to FIGS. 3 through 9.

White light emitted from the light source 60 is converged by the first collimating lens 71 into parallel or almost parallel diverging light. Light that is passed through the first colli-mating lens 71 is divided by the color filter 70 into first, second, and third color light beams, converged by the second collimating lens 91, and split by the beam splitter 93 such that split light beams travel through the first and third regions I and III, but not the second region II, for the driver 105. The split light beams are shaped to a predetermined shape by the cylindrical lenses 95 and 97 and enter the first and second effective regions A and B of the spiral lens disc 101.

As the first and second spiral lens discs 102 and 103 are turned by the driver 105, the light beams incident on the first and second effective regions A and B are split into light beams of different colors while being scrolled and converged by the cylindrical lens array 101a. As the split light beams pass through the fly-eye lens array 120, the cylindrical lenses 131, and the fourth relay lens 133, alternating bands of light of different colors are formed in predetermined positions. As an example, the bands of light of different colors may be ordered in the sequence of blue (B), green (G), and red (R). In this case, the light beam incident on the first effective region A is scrolled, forming bands of light of different colors in the order of (B, G, R)→(G, R, B)→(R, B, G). The light beam incident on the second effective region B is scrolled, forming bands of light of different colors in the order of (B, G, R)→(R, B, G)→(G, R, B). In other words, the bands of scrolling light of different colors from the first effective region A are ordered opposite to the bands of scrolling light of different colors from the second effective region B.

Hereinafter, embodiments of a projection type image display apparatus according to the present invention will be described in detail with reference to the appended drawings.

Figure 10:
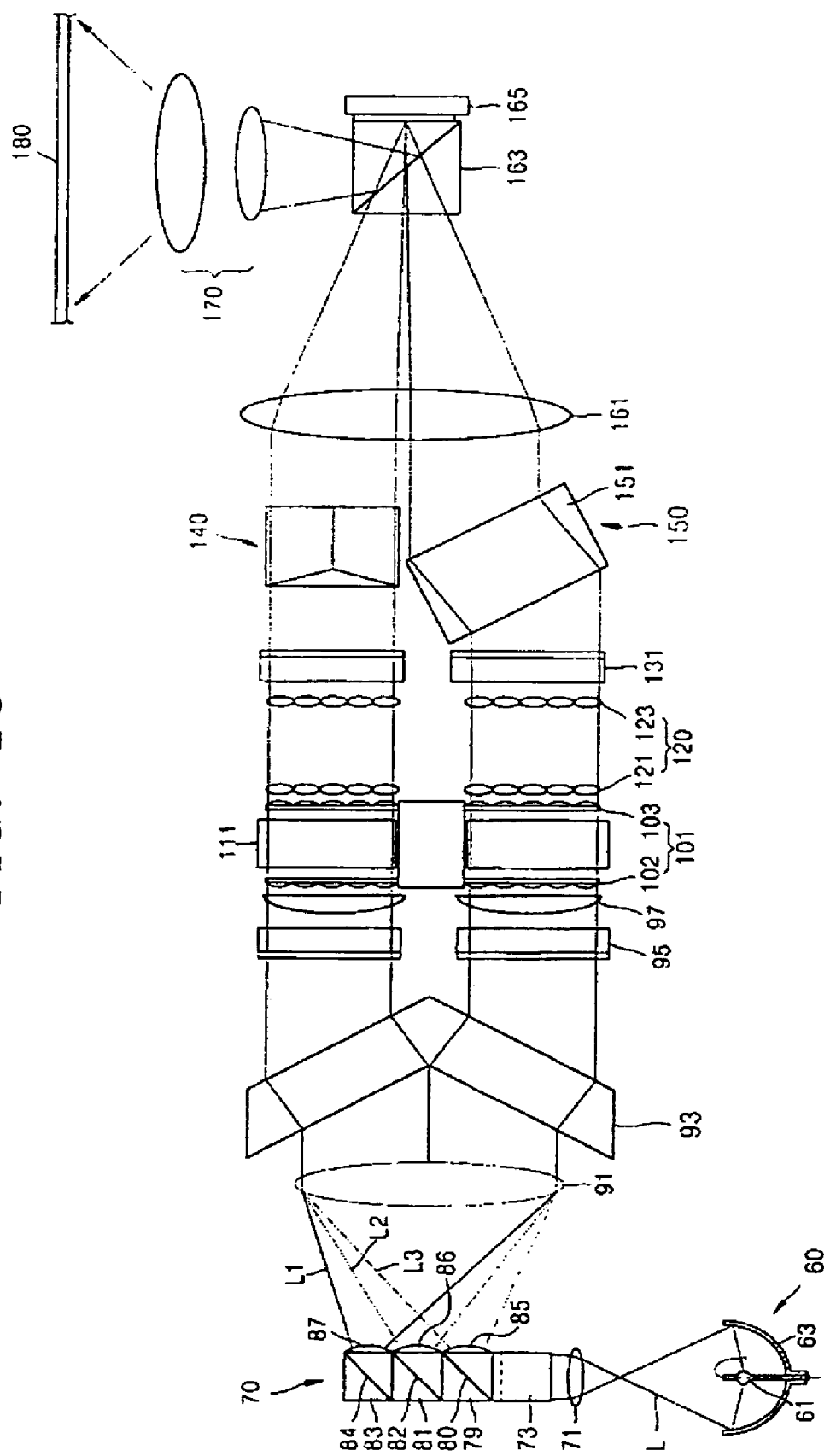
FIG. 10 illustrates the optical arrangement of a projection type image display apparatus according to an embodiment of the present invention.

Referring to FIG. 10, a projection type image display apparatus according to an embodiment of the present invention includes a color illuminating system described above, an image forming unit that forms images using light that has passed through the spiral lens disc unit 100 of the color illuminating system, and a projection lens unit 170 that enlarges and projects the images generated by the image forming unit.

The color illuminating system includes a light source 60, an optical unit, first and second collimating lenses 71 and 92, cylindrical lenses 95, 97, and 131, a spiral lens disc unit 100, and a fly-eye lens array 120. The optical unit includes a color filter 70, which separates light beams of different wavelengths from incident light, and a beam splitter 93, which shifts the light beams of predetermined wavelengths toward at least two effective regions of the spiral lens disc 101. The structures, arrangement, and functions of the constituent elements of the color illuminating system are substantially the same as in the color illuminating system according to the present invention described above with reference to FIGS. 3 through 9, and thus a detailed description on each of the constituent elements will not be provided here.

Alternatively, the optical unit may further include an integrated optical element that combines the light beams split by the beam splitter 93 and causes the same pattern of the alternating three color bands of light to scroll while the light beams from the cylindrical lenses 97 pass through the first and second effective regions A and B of the spiral lens disc 101.

Figure 11:
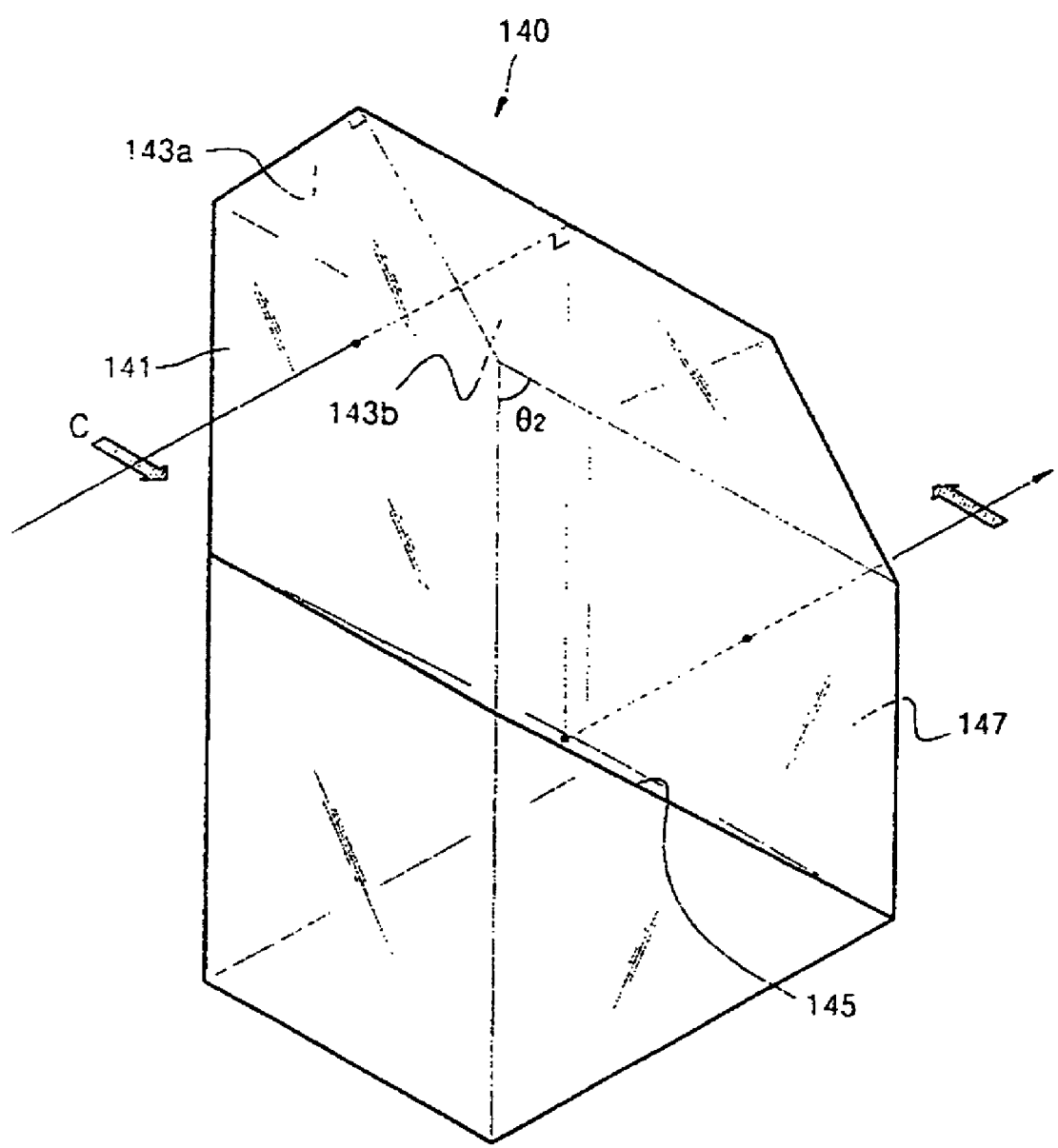
FIG. 11 is a perspective view of a scroll direction altering prism in FIG. 10.
Figure 12:
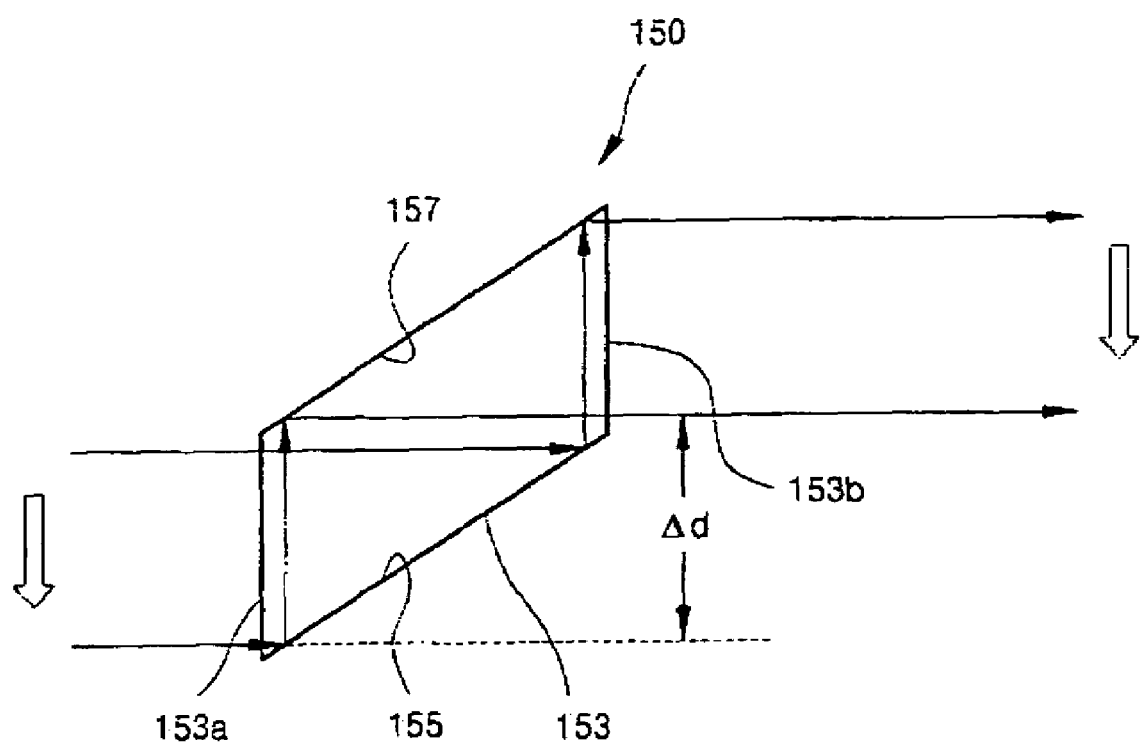
FIG. 12 illustrates a beam shifter in FIG. 10.

Referring to FIGS. 10 through 12, the integrated optical unit includes a scroll direction altering prism 140, which causes the same alternating pattern of light of the three colors to scroll while the light beams from the cylindrical lenses 97 pass through the first and second effective regions A and B of the spiral lens disc 101, and a beam shifter 150 that shifts one of the light beams split by the beam splitter 93 to combine them.

The scroll direction altering prism 140 is disposed in an optical path that is aligned with one of the first and second effective regions A and B of the spiral lens disc 101 to alter the direction of scrolling by the spiral lens disc 101 as described above. To this end, the scroll direction altering prism 140 may be formed like an Amichi prism.

Referring to FIG. 11, the scroll direction altering prism 140 includes an entrance surface 141, an exit surface 147, first reflection planes 143a and 143b that are perpendicular to each other and are inclined at an angle $\theta_2$ to the exit surface 147, and a second reflection plane 145 that reflects again the light reflected from the first reflection planes 143a and 143b toward the exit surface 147. Accordingly, when light that scrolls in the directions indicated by arrow C is incident on the entrance surface 141 of the scroll direction altering prism 140, the light goes toward the second reflection plane 145 due to the inclination of the first reflection planes 143a and 143b by $\theta_2$, not going vertically. The light is reflected from the first reflection planes 143a and 143b such that the light travels horizontally. In particular, light incident on and reflected from the first reflection plane 143a goes toward the first reflection plane 143b and is reflected again by the first reflection plane 143b toward the second reflection plane 145. Light incident on and reflected by the first reflection plane 143b is reflected again by the first reflection plane 143b toward the second reflection plane 145. Thus, the light incident on the scroll direction altering prism 140 scrolls in the direction indicated by arrow D in FIG. 11.

The scroll direction altering prism 140 may be formed like a penta prism.

The beam shifter 150 in FIG. 10 may be implemented with a refractive optical member 151 that has a hexahedral shape and is disposed at an angle to an optical path. The refractive optical member 151 has an entrance surface that is inclined at an angle to the optical axis of incident light and an exit surface that is separated a predetermined distance from and is parallel to the entrance surface. The refractive optical member 151 refracts and transmits incident light to shift it toward the scroll direction altering prism 140.

Alternatively, the beam shifter 150 may be implemented with a reflection optical member 153, as illustrated in FIG. 12, which shifts the incident light by total reflection.

The reflection optical member 153 has an entrance surface 153a and an exit surface 153b, which are perpendicular to the optical axis of the incident light, and first and second reflection planes 155 and 157, which are inclined at an angle to the optical axis of the incident light. The first reflection plane 155 is inclined to a height $\Delta d$ that corresponds to the width of the entrance surface 153a, i.e., the width of the incident light, to just shift the incident light without affecting the direction in which the incident light is scrolling.

When using the integrated optical element having the above structure, a fourth relay lens 161 may be further disposed in an optical path between the integrated optical element and the image forming unit 165.

Figure 13:
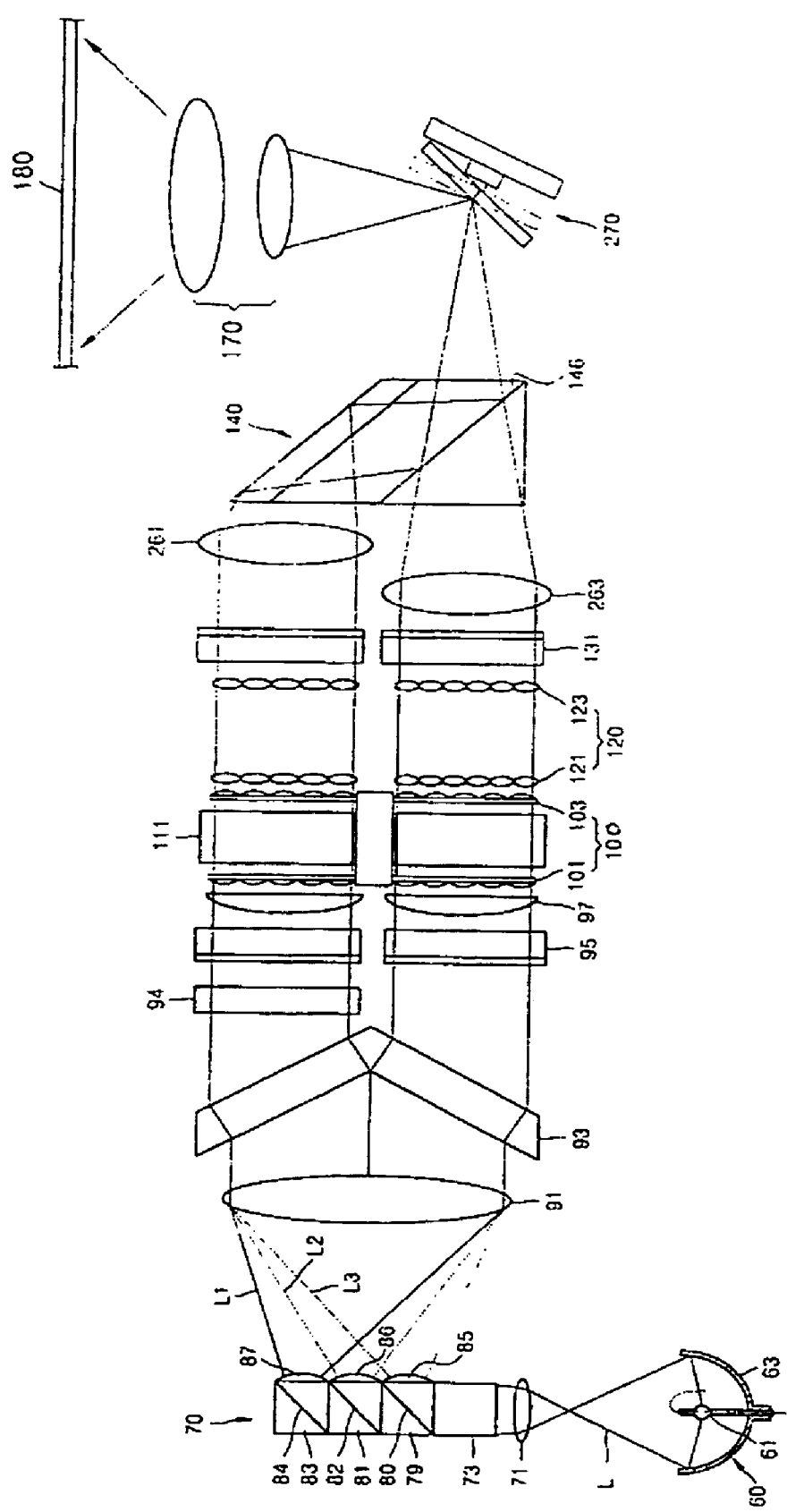
FIG. 13 illustrates the optical arrangement of a projection type image display apparatus according to another embodiment of the present invention.

As illustrated in FIG. 13, the integrated optical element may include a polarizing plate 94 that alters the polarization of light which will enter one of the first and second effective regions A and B of the spiral lens disc 101, the scroll direction altering prism 140, and a third polarizing beam splitter 146.

The polarizing plate 94 is disposed in an optical path between the beam splitter 93 and one of the first and second effective regions A and B of the first spiral lens disc 102. The polarizing plate 94 alters the polarization of the light beams passed through the first and second polarizing beam splitters 73 and 75 and the half-wave plate 77 (see FIG. 6) such that light beams having different polarization components transmit the first and second effective regions A and B of the spiral lens disc 101.

The structure and function of the scroll direction altering prism 140 in FIG. 13 are substantially the same as those of the scroll direction altering prism in FIG. 10, which has been described above in connection with the integrated optical element. However, unlike the scroll direction altering prism in FIG. 10, the scroll direction altering prism 140 in FIG. 13 includes the third polarizing beam splitter 146 instead of the second reflection plane 145 (see FIG. 11).

Figure 14:
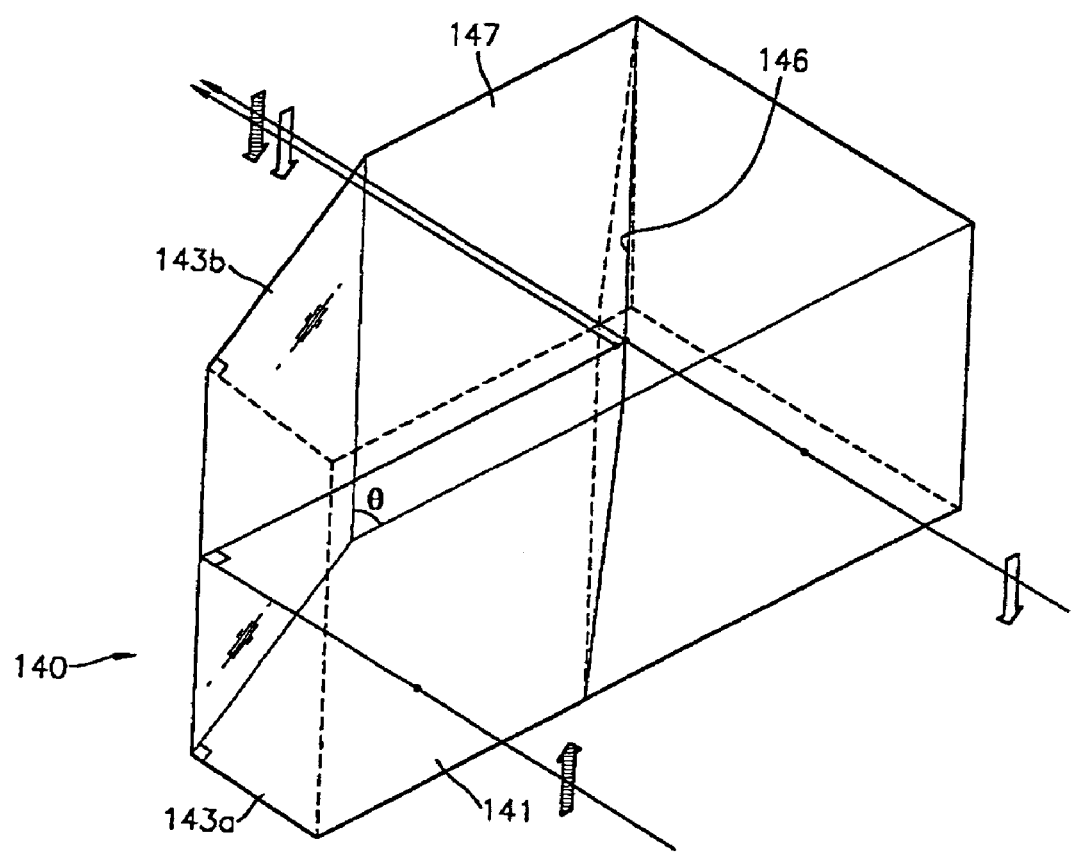
FIG. 14 is a perspective view of a scroll direction altering prism in FIG. 13.

The third polarizing beam splitter 146 is disposed on one surface of the scroll direction altering prism 140 to selectively transmit or reflect incident light according to the polarization of the incident light to make the light beams transmitted through the first and second effective regions A and B travel toward the image forming unit along the same optical path. In particular, light which has transmitted through the polarizing plate 94 so that its polarization has been altered is reflected by the first reflection planes 143a and 143b (see FIG. 14) to scroll in opposite directions and travel toward the third polarizing beam splitter 146. The light is then reflected from the third polarizing beam splitter 146. Meanwhile, light which has not transmitted through the polarizing plate 94 transmits through the scroll direction altering prism 140 and then the third polarizing beam splitter 146 and travels along the same optical path as the light reflected from the third polarizing beam splitter 146.

Alternatively, the projection type image display apparatus according to the present invention may further include a plurality of fourth relay lenses 261 and 263 to cause the first, second, and third color light beams scrolled by the spiral lens disc 101 to enter the image forming unit along the same optical path. The fourth relay lenses 261 and 263 are arranged in respective ones of the optical paths where the first and second effective regions A and B of the scroll direction altering prism 140 are positioned, separated different distances from the cylindrical lenses 131 to allow the scroll direction altering prism 140 to compensate for the optical path difference.

The image forming unit is positioned on a focal plane of the bands of the scrolling three red, blue, and green light beams and has three sub-divided image forming regions the scrolling red, blue, and green light beams enter.

As illustrated in FIG. 10, an embodiment of the image forming unit according to the present invention may include one reflection type liquid crystal display (LCD) 165 and a beam splitter 163.

The reflection type LCD 165 is a kind of light valve, which determines whether to change the polarization of incident polarized light on a pixel basis. The reflection type LCD 165 forms images by modulating the scrolling light beams from the spiral lens disc 101 on a pixel basis.

The beam splitter 163 is disposed in front of the reflection type LCD 165 to alter the path of the incident light. In particular, the beam splitter 163 makes predetermined polarized light received from the optical unit travel toward the reflection type LCD 165 and reflects polarized light reflected from the reflection type LCD 165 toward the projection lens unit 170. Although a single reflection type LCD 165 is illustrated in FIG. 10, it will be appreciated that at least two reflection type LCDs may be employed without limitation to the structure illustrated in FIG. 10.

The image forming unit according to the present invention illustrated in FIG. 13 includes a micro-mirror device 270 that generates images by modulating the scrolling light from the spiral lens disc 101 and reflects the generated images in a predetermined direction. In the micro-mirror device 270, micro-mirrors are individually driven on a pixel basis to reflect incident light toward different paths and thus form images. The structure of the micro-mirror device 270 is well known in the field, and a detailed description thereon will not be provided here.

The projection lens unit 170 is disposed between the image forming unit and a screen 180. The projection lens unit 170 enlarges and projects the images from the image forming unit on the screen 180.

As described above, a color illuminating system according to the present invention utilizes a spiral lens disc unit with two effective regions to raise the amount of effective light for high-efficiency color light illumination. The spiral lens disc unit contributes to simplifying the optical configuration of the illuminating system and minimizing the overall system size.

A projection type image display apparatus according to the present invention, which employs the color illuminating system, does not require an additional element for synchronizing scrolling light beams due to the use of the spiral lens disc unit that can scroll light beams with the two effective regions defined in its body.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A color illuminating system comprising:
   a light source that generates and emits white light;
   a spiral lens disc that periodically scrolls light by rotational movement and has a spiral cylindrical lens array, which includes a plurality of cylindrical lenses, on at least one surface; and
   an optical unit that separates light beams of different wavelengths from the white light emitted from the light source and guides the light beams to enter at least two effective regions of the spiral lens disc.

2. The color illuminating system of claim 1, wherein the optical unit further comprises:
   a color filter that separates the light beams of different wavelengths from the white light received from the light source and make the light beams travel in a predetermined direction; and
   a beam splitter that splits the light beams from the color filter to enter the at least two effective regions of the spiral lens disc.

3. The color illuminating system of claim 2, wherein the color filter further comprises;
   a first dichroic prism that has a first mirror surface that is inclined at an angle to the optical axis of the incident light, reflects a first color light beam in the incident white light, and transmits light other than the first color light beam;
   a second dichroic prism that is disposed next to the first dichroic prism and has a second mirror surface that is inclined at an angle to the optical axis of the incident light, reflects a second color light beam in the light transmitted through the first dichroic prism, and transmits light other than the second color light; and
   a third dichroic prism that is disposed next to the second dichroic prism and has a third mirror surface that is inclined at an angle to the optical axis of the incident light and reflects a third color light beam in the light transmitted through the second dichroic prism,
   wherein the first, second, and third mirror surfaces of the first, second, and third dichroic prisms, which are located inside the color filter, allow light that enters at an angle satisfying the conditions of internal total reflection to be totally reflected, minimizing loss of the first, second, and third color light beams.

4. The color illuminating system of claim 3, further comprising;
   a first polarizing beam splitter that is formed on an entrance surface of the first dichroic prism and transmits a first polarization component in the incident non-polarized white light toward the first dichroic prism and reflects a second polarized light;
   a second polarizing beam splitter that reflects the second polarized light reflected by the first polarizing beam splitter toward the first dichroic prism; and
   a half-wave plate that is arranged between the first dichroic prism and one of the first and second polarizing beam splitters to alter the phase of one of the first and second polarized light such that the first and second polarized light are in-phase.

5. The color illuminating system of claim 3, further comprising a first collimating lens in an optical path between the light source and the color filter, the first collimating lens converting and transmitting the incident non-polarized white light.

6. The color illuminating system of claim 3, further comprising first, second, and third relay lenses that are arranged opposite to the exit surfaces of the first, second, and third dichroic prisms, respectively, and diverge the first, second, and third color light beams, respectively, at a predetermined angle.

7. The color illuminating system of claim 6, further comprising a second collimating lens that is arranged in an optical path between the color filter and the beam splitter and which converges the first, second, and third color light beams from the color filter.

8. The color illuminating system of claim 6, further comprising a plurality of cylindrical lenses that are arranged in an optical path between the beam splitter and the spiral lens disc and in an optical path to receive light from the spiral lens disc and shape the first, second, and third color light beams received at different angles from the beam splitter.

9. The color illuminating system of claim 2, further comprising a second collimating lens that is arranged in an optical path between the color filter and the beam splitter and which converges first, second, and third color light beams from the color filter.

10. The color illuminating system of claim 2, wherein the beam splitter comprises:
    an entrance surface that has an arrow-shaped cross-section and which refracts incident first, second, and third color light beams outward away from the optical axis such that at least two split light beams are directed toward the spiral lens disc; and
    an exit surface that is parallel to the entrance surface and which refracts the at least two split light beams to be closer to the optical axis and parallel to the first, second, and third light beams incident on the entrance surface.

11. The color illuminating system of claim 2, further comprising a plurality of cylindrical lenses that are arranged in an optical path between the beam splitter and the spiral lens disc and in an optical path to receive light from the spiral lens disc and which shape split light beams from the beam splitter.

12. The color illuminating system of claim 1, wherein the spiral lens disc comprises:
   a first spiral lens disc that scrolls incident light; and
   a second spiral lens disc that is spaced a predetermined distance from the first spiral lens disc and which corrects the angle of divergence of at least two light beams from the first spiral lens disc.

13. The color illuminating system of claim 12, further comprising a glass rod that is disposed in an optical path between the first and second spiral lens discs and which controls the angle of divergence of the at least two light beams from the first spiral lens disc.

14. The color illuminating system of claim 1, further comprising a fly-eye lens array that is arranged in an optical path to receive the at least two light beams from the spiral lens disc and which forms bands of light of different colors in separate regions from the at least two scrolling light beams from the spiral lens disc.

15. The color illuminating system of claim 14, wherein the fly-eye lens array comprises:
   a plurality of first fly-eye lenses that are arranged in the optical paths of the at least two light beams from the beam splitter, respectively, and have a two-dimensional array of protrusions on an entrance surface and/or an exit surface; and
   a plurality of second fly-eye lenses that are arranged next to the plurality of first fly-eye lenses and which have a two-dimensional array of protrusions on an entrance surface or an exit surface.

16. The color illuminating system of claim 14, further comprising a fourth relay lens that is arranged in the optical path of light beams from the fly-eye lens array and which focuses the bands of light of different colors from the fly-eye lens in predetermined positions.

17. A projection type image display apparatus comprising:
   a light source that generates and emits white light;
   a spiral lens disc that periodically scrolls light by rotational movement and which has a spiral cylindrical lens array, which includes a plurality of cylindrical lenses, on at least one surface;
   an optical unit that separates light beams of different wavelengths from the white light emitted from the light source and guides the light beams to enter at least two effective regions of the spiral lens disc;
   an image forming unit that forms images using the light from the spiral lens disc; and
   a projection lens unit that enlarges and projects the images formed by the image forming unit on a screen.

18. The projection type image display apparatus of claim 17, wherein the optical unit comprises:
   a color filter that separates the light beams of different wavelengths from the white light received from the light source and make the light beams travel in a predetermined direction; and
   a beam splitter that splits the light beams from the color filter to enter the at least two effective regions of the spiral lens disc.

19. The projection type image display apparatus of claim 18, wherein the color filter comprises;
   a first dichroic prism that has a first mirror surface that is inclined at an angle to the optical axis of the incident light, reflects a first color light beam in the incident white light, and transmits light other than the first color light beam;
   a second dichroic prism that is disposed next to the first dichroic prism and has a second mirror surface that is inclined at an angle to the optical axis of the incident light, reflects a second color light beam in the light transmitted through the first dichroic prism, and transmits light other than the second color light beam; and
   a third dichroic prism that is disposed next to the second dichroic prism and has a third mirror surface that is inclined at an angle to the optical axis of the incident light and reflects a third color light beam in the light transmitted through the second dichroic prism,
   wherein the first, second, and third mirror surfaces of the first, second, and third dichroic prisms, which are located inside the color filter, allow light that enters at an angle satisfying the conditions of internal total reflection to be totally reflected, minimizing loss of the first, second, and third color light beams.

20. The projection type image display apparatus of claim 19, further comprising;
   a first polarizing beam splitter that is formed on an entrance surface of the first dichroic prism and which transmits first polarization component in the incident non-polarized white light toward the first dichroic prism and reflects second polarized light;
   a second polarizing beam splitter that reflects the second polarized light reflected by the first polarizing beam splitter toward the first dichroic prism; and
   a half-wave plate that is arranged between the first dichroic prism and one of the first and second polarizing beam splitters to alter the phase of one of the first and second polarized light such that the phases of the first and second polarized light are equal.

21. The projection type image display apparatus of claim 19, further comprising a first collimating lens in an optical path between the light source and the color filter, the first collimating lens converting and transmitting the incident non-polarized white light.

22. The projection type image display apparatus of claim 19, further comprising first, second, and third relay lenses that are arranged opposite to the exit surfaces of the first, second, and third dichroic prisms, respectively, and which diverge the first, second, and third color light beams, respectively, at a predetermined angle.

23. The projection type image display apparatus of claim 22, further comprising a second collimating lens that is arranged in an optical path between the color filter and the beam splitter and which converges the first, second, and third color light beams from the color filter.

24. The projection type image display apparatus of claim 22, further comprising a plurality of cylindrical lenses that are arranged in an optical path between the beam splitter and the spiral lens disc and in an optical path to receive light from the spiral lens disc and shape the first, second, and third color light beams received at different angles from the beam splitter.

25. The projection type image display apparatus of claim 18, further comprising a second collimating lens that is arranged in an optical path between the color filter and the beam splitter and which converges first, second, and third color light beams from the color filter.

26. The projection type image display apparatus of claim 18, wherein the beam splitter comprises:
   an entrance surface that has an arrow-shaped cross-section and which refracts incident first, second, and third color light beams outward away from the optical axis such that at least two split light beams go toward the spiral lens disc; and an exit surface that is parallel to the entrance surface and refracts the at least two split light beams to be closer to the optical axis and parallel to the first, second, and third light beams incident on the entrance surface.

27. The projection type image display apparatus of claim 18, further comprising a plurality of cylindrical lenses that are arranged in an optical path between the beam splitter and the spiral lens disc and in an optical path to receive light from the spiral lens disc and shape split light beams from the beam splitter.

28. The projection type image display apparatus of claim 17, wherein the spiral lens disc comprises:

a first spiral lens disc that scrolls incident light; and a second spiral lens disc that is spaced a predetermined distance from the first spiral lens disc and which corrects the angle of divergence of at least two light beams from the first spiral lens disc.

29. The projection type image display apparatus of claim 28, further comprising a glass rod that is disposed in an optical path between the first and second spiral lens discs and which controls the angle of divergence of the at least two light beams from the first spiral lens disc.

30. The projection type image display apparatus of claim 17, further comprising a fly-eye lens array that is arranged in an optical path to receive the at least two light beams from the spiral lens disc and which forms bands of light of different colors in separate regions from the at least two scrolling light beams from the spiral lens disc.

31. The projection type image display apparatus of claim 30, wherein the fly-eye lens array comprises:

a plurality of first fly-eye lenses that are arranged in the optical paths of the at least two light beams from the beam splitter, respectively, and which have a two-dimensional array of protrusions on an entrance surface or an exit surface; and a plurality of second fly-eye lenses that are arranged next to the plurality of first fly-eye lenses and which have a two-dimensional array of protrusions on an entrance surface or an exit surface.

32. The projection type image display apparatus of claim 17, wherein the optical unit further comprises an integrated optical element that alters the direction in which light from one of the first and second effective regions of the spiral lens disc scrolls such that light beams from the first and second effective regions scroll in the same direction and that combines the light beams from the first and second effective regions.

33. The projection type image display apparatus of claim 32, wherein the integrated optical element comprises:

a scroll direction altering prism that is arranged in the optical path of the light beam from one of the first and second effective regions of the spiral lens disc and alters the direction in which the light beam from one of the first and second effective regions scrolls such that the light beams from the first and second effective regions scroll in the same direction; and a beam shifter that is arranged in the optical path of the light beam from one of the first and second effective regions of the spiral lens disc and which shifts the light beam from one of the first and second effective regions toward the light beam from the other effective region to combine the light beams from the first and second effective regions.

34. The projection type image display apparatus of claim 33, wherein the scroll direction altering prism is an Amichi prism that alters the scroll direction by reversing light from one of the first and second effective regions of the spiral lens disc.

35. The projection type image display apparatus of claim 33, wherein the beam shifter shifts the incident light beam by refracting and transmitting the incident light based on a difference in refractive index and which comprises an entrance surface that is inclined at an angle to the optical axis of the incident light beam and an exit surface that is arranged parallel to and separated a predetermined distance from the entrance surface.

36. The projection type image display apparatus of claim 33, wherein the beam shifter shifts the incident light beam by totally reflecting the incident light beam and which comprises first and second reflection planes that are inclined at an angle to the optical axis of the incident light beam.

37. The projection type image display apparatus of claim 32, wherein the integrated optical element comprises:

a polarizing plate that is arranged in an optical path in front of one of the first and second effective regions of the spiral lens disc and which alters the polarization of incident light such that the light beams transmitted through the first and second effective regions have different polarization components;

a scroll direction altering prism that is arranged in the optical path of the light beam from one of the first and second effective regions of the spiral lens disc and which alters the direction in which the light beam from one of the first and second effective regions scrolls such that the light beams from the first and second effective regions scroll in the same direction; and a third polarizing beam splitter that is formed on one surface of the scroll direction altering prism and which selectively transmits or reflects incident light according to the polarization of the incident light to make the light beams transmitted through the first and second effective regions travel toward the image forming unit along the same optical path.

38. The projection type image display apparatus of claim 37, further comprising a plurality of fourth relay lenses that are arranged in the optical paths of the light beams from the first and second effective regions of the spiral lens disc, respectively, and which guide scroll first, second, and third color light beams from the spiral lens disc to enter the image forming unit along the same optical path.

39. The projection type image display apparatus of claim 17, wherein the image forming unit comprises:

a reflection type liquid crystal display that forms images by modulating the scrolling light from the spiral lens disc; and a beam splitter that is arranged in front of the reflection type liquid crystal display and which alters the optical path of incident light such that light from the optical unit goes toward the reflection type liquid crystal display and light from the reflection type liquid crystal display is directed toward the projection lens unit.

40. The projection type image display apparatus of claim 17, wherein the image forming unit is a micro-mirror device that generates the images by modulating the scrolling light from the spiral lens disc and which reflects the generated images in a predetermined direction.

* * * * *